Sept. 16, 1958     W. S. SACHER     2,852,629
SPACER TABLE TEMPLET
Filed Aug. 20, 1956                            2 Sheets-Sheet 1
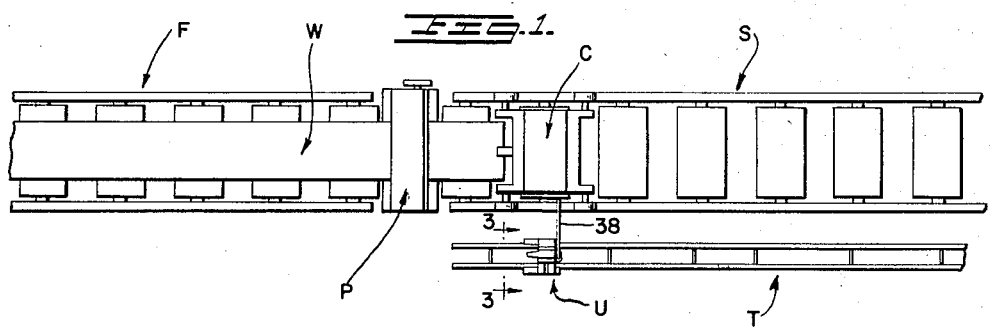
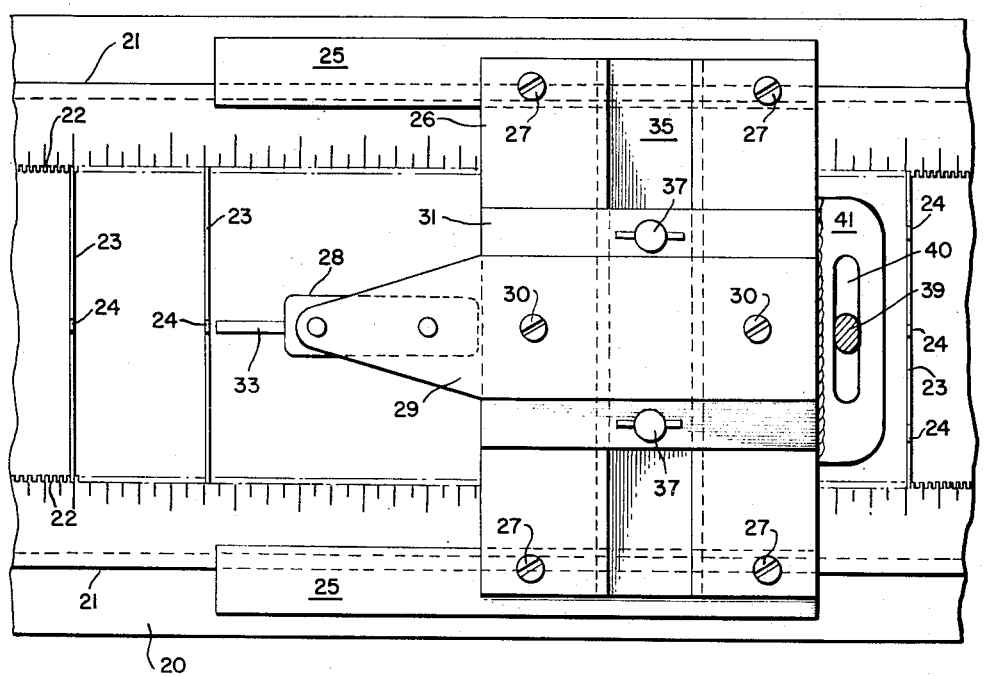
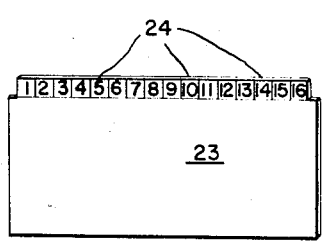
INVENTOR
WILLIAM S. SACHER
BY
ATTORNEY Sept. 16, 1958 W. S. SACHER 2,852,629
SPACER TABLE TEMPLET
Filed Aug. 20, 1956 2 Sheets-Sheet 2
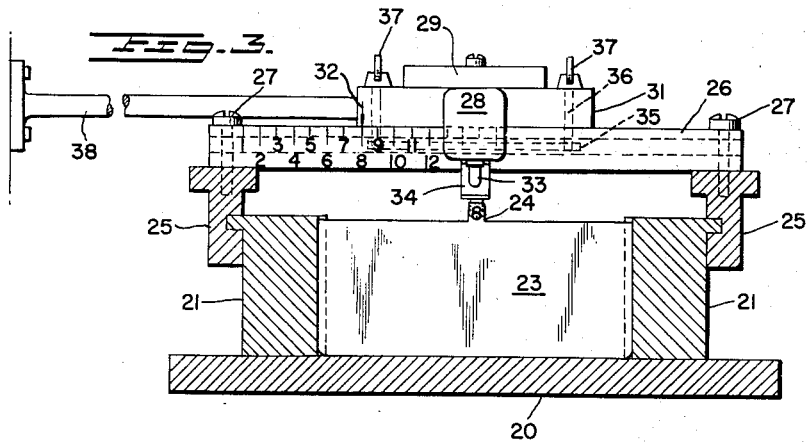
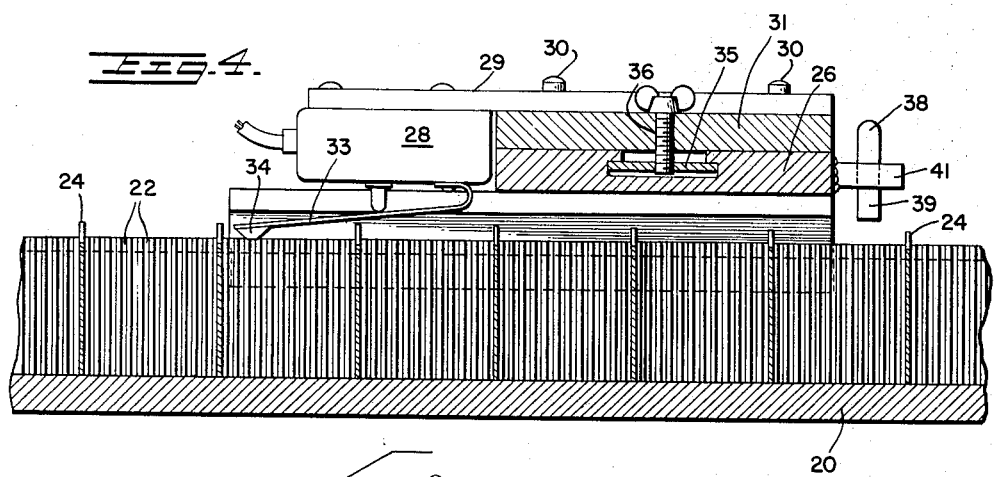
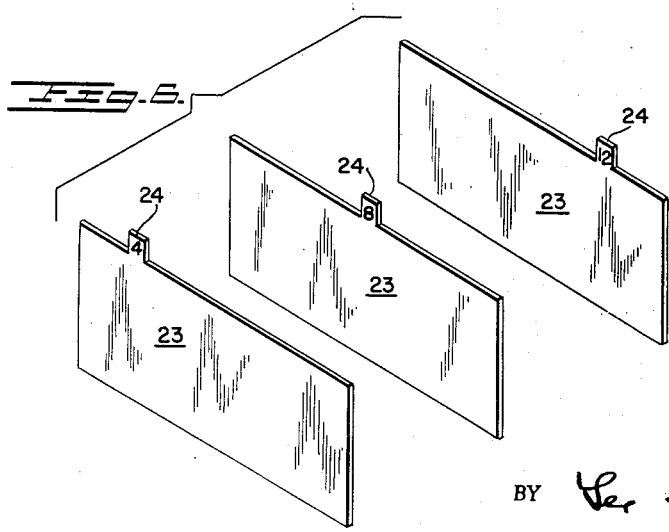
INVENTOR
WILLIAM S. SACHER
BY
ATTORNEY United States Patent Office 2,852,629
Patented Sept. 16, 1958

2,852,629

SPACER TABLE TEMPLET

William S. Sacher, Pottstown, Pa., assignor of fifty percent to Lewis Cambell, Jr., Boyertown, Pa.

Application August 20, 1956, Serial No. 604,957

5 Claims. (Cl. 200—46)

The present invention deals with templet means for the control of machines for punching rivet holes in structural steel; and this application is a continuation-in-part of my application Serial No. 390,046, filed Novmeber 3, 1953, now abandoned, entitled Templets for Spacing Machines.

Known machines of the type for which this invention is designed comprise a pair of longitudinally aligned tables and a gang punch between their adjacent ends. Structural steel elements comprising the work are fed along one table to pass beneath the punch under the pull of a motorized carriage, known in the art as a "mule," which travels upon the other table. This latter table is commonly known in the art as a spacer table and the first as a feed table. Movement of the motorized carriage is controlled automatically from a series of upright pegs positioned in sockets provided in wood templet strips arranged alongside and parallel to the spacer table, in a manner well known to the art. The templet pegs usually are laid out in separate, parallel, rectilinear series each representative of a distinct work assignment that differs from the others and which requires its own distinctive operation of the motorized carriage from a starting point common to all adjacent the punch. Each series of templet pegs is known in the art as a "track" and is individually identified by letter or number; so that the number of separate work assignments governed by any given templet assembly depends upon the number of tracks which can be laid out on that particular assembly with regard to its width and the parallel spacing required between the various series of pegs. Each peg, or equivalent abutment, defines a point at which the carriage is automaticaly stopped so that the operator may then operate the punch selectively in accordance with directions given on a shop drawing, blueprint, or other record and corresponding to that particular stop point. For example: work assigned to track "A" may be a 100 ft. bridge girder web, and work assigned to track "B" may be a flange cover plate for a 78 ft. girder web. At the first stop point on track "A" the directions furnished for that track may specify the punching of four rivet holes; at the next stop point for that track the directions may call for only one hole; at the next following point two or more holes may be required; and so on for the length of the work. When the work assigned for track "A" is finished the punched web is removed and is replaced by the plate assigned to track "B." The motorized carriage is then conditioned for operation in accordance with control by track "B" and at each stop point determined by the pegs of that track the work is punched in accordance with the directions provided for the operator. The sequence is carried out for all the tracks, after which, unless the work is repetitive, a new templet must be placed in position. Preparation of the templets is highly specialized work and requires the services of skilled templet makers; it is slow and very costly. The sections of wood comprising the templet strips are subject to distortion caused by changes in ambient temperature and humidity; so that they cannot be used over extended periods of time.

A primary object of the present invention is to provide novel templet means for use with machines of the character above described, which eliminates the use of wooden templets and the need for skilled templet makers.

Other and incidental objects will be apparent from the following description taken in conjunction with the accompanying drawings, in which:

Fig. 1 is a schematic top plan view of a conventional punching machine and spacer table organization equipped with the novel templet means of the present invention;

Fig. 2 is an enlarged fragmentary top plan view of the templet means, per se;

Fig. 3 is an enlarged sectional view taken substantially on the line 3—3 of Fig. 1;

Fig. 4 is a central longitudinally vertical sectional view through Fig. 2;

Fig. 5 is an elevation of a templet blank forming a part of the present invention;

Fig. 6 is a group perspective view of a plurality of the blanks arranged in service relation.

The schematic showing of Fig. 1 illustrates the manner in which the present invention is associated with a known type of structural steel punch machine in which a power gang punch P is disposed between the adjacent ends of a work feed table F and a work spacer table S arranged in longitudinal alignment. Each table has rollers for the conveyance of the work W past the punch under the pull of a motorized carriage C mounted for movement along the length of the spacer table. The templet assembly comprising the present invention is positioned along the operator's side of the spacer table S in parallel spaced relation thereto and extends for the full length of the table. The assembly includes a stationary templet support T and a control unit U movable thereon and driven by the motorized carriage C.

In the present invention the conventional wood templets of prior art practice are substituted by the templet assembly detailed in Figs. 2–4. The assembly, indicated generally at T and U in Fig. 1, comprises a bed plate 20 fixed on a suitable support, not shown, extending alongside the operator's side of the spacer table S for its full length from a point adjacent the gang punch P. The bed plate is provided with a pair of parallel, upstanding, guide rails 21 rigidly fixed in any suitable manner to the bed plate and coextensive therewith for the full length of the spacer table. A series of vertical parallel grooves 22 is formed in each of the opposed inner faces of the rails 21 along their entire length, with the grooves in registry transversely of the rails and spaced equidistantly, preferably one-sixteenth inch apart. The top face of each rail bears conventional scale graduations indicating feet, inches and fractions thereof. These grooves receive and hold any desired number and spacing of metal templet blanks 23 similar to filing cards and having on the upper edge a series of integral tabs 24 individually numbered (here from 1-16) to designate a particular work assignment track. The tabs are separated by scoring lines so that they may be broken off easily for removal.

The rails 21 are slidably interlocked at their outer sides, preferably by a horizontal tongue and groove connection, with the side bars 25 of the control unit U. This unit is slidable longitudinally upon and along the rails 21 and has an operating connection, later described, with the motorized carriage C for simultaneous movement by and with the carriage. The control unit consists, in addition to the side bars 25, of a cross block 26 rigidly secured by fastening elements 27 to the top faces of the side bars and extending transversely therebetween. The cross block connects the side bars rigidly for movement in unison and provides a mount for a micro-switch assembly that is bodily movable on the cross block to various positions of adjustment transversely between the side bars, which positions correspond in number and spacing to the templet blank tabs 24 and are similarly identified by the work assignment track numbers 1—16 on the front face of the block, as shown in Fig. 3.

The micro-switch assembly consists of a known design micro-switch 28, a product of General Electric Company and others, carried by and depending from the forwardly projecting front end of a carrier arm 29 that is rigidly secured by fastening elements 30 to the top face of a shiftable support 31. Support 31 is a relatively thick rectangular block that is slidable on the top face of the cross block 26 transversely between the side bars 25 and which has on its front face a mark or other suitable indicator 32 for registry with a selected one of the work assignment track numbers on the cross block. A resilient finger 33 attached to the bottom of the switch casing projects longitudinally beyond the rear end of the casing beneath the operating plunger of the switch to actuate the same each time the finger is lifted, which occurs whenever a rounded nub 34 on the free end of the finger engages and rides up on the top of a templet blank tab 24 disposed in the longitudinal path of travel of the finger.

The switch assembly also includes means for anchoring it in position to align the actuator finger with a selected one of the work assignment tracks. For this purpose the top face of the cross block 26 is recessed to provide an open-ended channel slot extending transversely between the side bars 25 at right angles thereto and having undercut side walls which slidably receive a metal lock strip 35. The lock strip is adapted to seat loosely in the channel and is connected with the switch support 31 by threaded bolts 36 headed in the lock strip and extending upwardly and loosely through the switch support at opposite sides of the carrier 29. Wing nuts 37 on the bolt ends serve to pull the lock strip up when they are tightened and thereby clamp it securely against the overhang of the channel slot walls to anchor the switch and its support firmly in the position set.

As hereinbefore stated the entire organization comprising the side bars 25, cross block 26, the support 31, carrier 29, micro-switch 28, and its actuator finger 33 constitute a control unit that is moved bodily along the rails 21 by and in unison with the work pulling carriage C. This movement is effected by an operating connection 38, here shown as a rigid bar, between the control unit and the carriage. Bar 38 is attached rigidly at its inner end to a suitable point on the carriage and projects laterally therefrom over and in spaced relation above the inner rail 21 of the templet assembly. The outer end of the bar is vertically downturned to provide a terminal portion 39 that is vertically and horizontally slidable through a closed end slot 40 in the horizontal flange of a bracket 41 welded or otherwise attached rigidly to the rear face of the cross block 26.

For purposes of explanation, and without restrictive intent, let it be assumed that the templet of the present invention is shown set up for work on the spacer table assigned to track "8." Working from the dimensions given on a shop drawing of the work, and with reference to the scale graduations on the rails 21 for measurement, an operator places a templet blank 23 in a transversely aligned pair of the rail grooves 22 at each point along the length of the rails which correspond to a point on the work where one or more rivet holes is to be punched. Each such point is also a stop point for the carriage C. Prior to placement the blanks 23 are stripped of all their tabs 24 except the tab bearing the track number "8." At the same time, if desired, templet blanks may be set up in the same manner for other or for all work assignment tracks within the capacity of the templet assembly because of the fact that when the micro-switch is set in position for any particular track its actuator finger 33, which is no wider than a single tab 24, cannot engage templet tabs in any other track. If it be determined from the various drawings covering all the different work assignments that work assigned to two or more tracks is to be punched at points which are at the same location on the scales of the rails 21, the templet blank set at that location may retain those of the tabes 24 which bear the identifying numbers of the work tracks in which the coincidence occurs. This is illustrated by the templet blank at the right end of Fig. 2, which retains the tabs representing the three tracks identified in Fig. 6.

Following placement of all templet blanks at their proper locations along the length of the rails 21, the switch support 31 is shifted on the cross block 26 to its proper location for the particular work track selected for the first operation, as determined by registry of the indicator 32 on the support with the selected track number on the subjacent face of the cross block; whereupon the wing nuts are tightened to clamp the switch assembly securely in the position set. In this position the actuator finger 33 and all the templet tabs 24 which bear the number of the selected track are aligned in a common vertical plane longitudinally between and parallel to the guide rails 21.

When the electrically driven motorized work carriage C, Fig. 1, moves to the right along the spacer table S to pull the work beneath and past the punch P it acts through the connection 38 to move the control unit along the guide rails 21 in the same direction and at the same rate. The spring actuator finger 33 of the control unit switch is biased to a normal position in which its terminal nub 34 is in a horizontal plane spaced slightly above the top edges of the templet blanks but not high enough to clear any of the tabs 24 thereon. The tabs thus constitute abutments in the path of travel of the actuator finger, and when its nub engages a tab it rides up on the top of the tab in a camming action which lifts the actuator against the switch plunger with sufficient force to operate the switch. Such operation of the switch, which has conventional circuit connection, not shown, to the electric motor of the carriage, immediately stops the carriage so that the work is in position for punching at the precise point indicated on the shop drawing for that particular work.

Following conventional practice the operator actuates the punch in the pattern prescribed for that point by directions given to him in advance. After the work is punched the carriage moves ahead automatically by means operating in a manner well known to the art and which is not a part of the present invention. Work advancing movement of the carriage then continues until the switch is again operated by engagement of its actuator finger against the next following templet tab which is located in the selected track, whereupon the carriage is again stopped so that the work may be punched. The cycle of operations is repeated over the length of the rails for the full distance of the total length of rivet hole spacings for the work assigned.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A punching machine work spacer table templet assembly comprising a bed plate, a pair of laterally spaced parallel guide rails fixed on said bed plate and extending longitudinally thereon for the full length of a spacer table, a work movement control unit movable along and on said guide rails, a portion of the control unit spanning the space between the guide rails, said guide rails having in their opposed inner faces a series of transversely aligned vertical grooves for the full length of each, a plurality of rigid card-like templet blanks individually seated in selected pairs of opposed grooves at points spaced longitudinally along the guide rails, said spanning portion of the control unit having thereon indicia denoting a plurality of individually differently identified work assignment tracks, said templet blanks carrying upstanding abutments each of which bears an individual identification symbol characteristic to a work assignment track, control means on said control unit and having an actuator positioned for operative contact against templet abutments disposed in its path of travel, and said control means being bodily movable transversely of the guide rails on the spanning portion of the control unit to different positions of adjustment selected with reference to the work track identification indicia on the control unit.

2. In the structure of claim 1, said control means comprising a micro-switch having an operating plunger, said actuator comprising a spring finger biased away from the plunger, and a cam tip on said finger for moving it to actuate the switch plunger upon engagement with a templet abutment.

3. In the structure of claim 1, said abutments on the templet blanks being removable tabs each bearing an individual identification symbol characteristic to a corresponding one of the work assignment tracks identified on the spanning portion of the control unit.

4. A templet assembly comprising oppositely disposed vertically grooved guide rails in laterally spaced parallel relation and rigidly secured to a base, at least one card-like templet blank seated in a transversely aligned pair of the grooves and having on its top edge at least one upstanding tab, a micro-switch assembly mounted on the guide rails for movement longitudinally thereon in a path of travel at right angles to the templet blank, a portion of said assembly being movable on another portion thereof to various positions of adjustment in a direction at right angles to said path of travel of the micro-switch assembly, and a micro-switch on the first-named of said portions and having an actuator extending longitudinally in said path of travel of the micro-switch assembly for operative engagement by an templet tab aligned with the actuator in said path of travel of the micro-switch assembly.

5. In the structure of claim 4, the second-named of said portions having in its upper face a channel extending transversely with respect to said guide rails and having undercut side walls, a lock strip seated loosely in the channel beneath the overhang of the undercut side walls and slidable longitudinally in the channel, threaded bolts headed in the lock strip and extending upwardly through said first-named portion, and nuts threaded on the ends of said bolts above the top face of said first-named portion in abutment thereagainst and operative to pull the lock strip into clamping engagement against the overhang of the chanel side walls.

References Cited in the file of this patent

UNITED STATES PATENTS

| | | |
|---|---|---|
| 756,959 | Herman | Apr. 12, 1904 |
| 897,199 | Feindt | Aug. 25, 1908 |
| 1,036,695 | Patchell | Aug. 27, 1912 |
| 1,625,215 | Lacke | Apr. 19, 1927 |
| 1,780,610 | Weinlich | Nov. 4, 1930 |
| 1,989,071 | Anderson | Jan. 29, 1935 |
| 2,502,785 | Gottschalk | Apr. 4, 1950 |
| 2,641,661 | Puerner et al. | Jan. 9, 1953 |